(12) United States Patent
Roeder

(10) Patent No.: US 7,900,992 B2
(45) Date of Patent: Mar. 8, 2011

(54) TRUNK LID LINK ASSEMBLY FOR CONVERTIBLE VEHICLE

(75) Inventor: Holger Roeder, Eislingen (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 136 days.

(21) Appl. No.: 12/424,122

(22) Filed: Apr. 15, 2009

(65) Prior Publication Data

US 2009/0230719 A1   Sep. 17, 2009

Related U.S. Application Data

(63) Continuation of application No. 11/668,552, filed on Jan. 30, 2007, now abandoned.

(30) Foreign Application Priority Data

Feb. 1, 2006   (DE) .......................... 10 2006 005 001

(51) Int. Cl.
*B60J 7/00* (2006.01)

(52) U.S. Cl. ................................................. 296/107.08

(58) Field of Classification Search ............. 296/107.08, 296/108, 107.1, 223, 76; 220/263; 224/924; 292/201
See application file for complete search history.

(56) References Cited

U.S. PATENT DOCUMENTS

| | | | | |
|---|---|---|---|---|
| 5,655,331 | A * | 8/1997 | Schrader et al. | 49/280 |
| 5,746,470 | A * | 5/1998 | Seel et al. | 296/108 |
| 5,823,606 | A * | 10/1998 | Schenk et al. | 296/107.08 |
| 6,164,713 | A * | 12/2000 | Graf et al. | 296/107.08 |
| 6,186,577 | B1 * | 2/2001 | Guckel et al. | 296/107.07 |
| 6,193,300 | B1 * | 2/2001 | Nakatomi et al. | 296/107.08 |
| 6,325,445 | B1 * | 12/2001 | Schenk | 296/107.08 |
| 6,352,298 | B1 * | 3/2002 | Hayashi et al. | 296/107.08 |
| 6,811,206 | B2 | 11/2004 | Wagner | |
| 6,824,194 | B2 * | 11/2004 | Weissmueller et al. | 296/136.05 |
| 6,916,058 | B2 * | 7/2005 | Krajenke | 296/76 |
| 7,004,529 | B2 * | 2/2006 | Guillez et al. | 296/76 |

(Continued)

FOREIGN PATENT DOCUMENTS

DE   199 46 454 A1   4/2000

(Continued)

*Primary Examiner* — Kiran B. Patel
(74) *Attorney, Agent, or Firm* — Brooks Kushman P.C.

(57) ABSTRACT

A link assembly for opening and closing a trunk lid of a vehicle having a movable roof includes lifting and locking links. The lifting link connects the lid to the vehicle to move the lid between a closed position covering the trunk, an opened position in which the front lid edge is raised, and another opened position in which the rear lid edge is raised. The locking link is adjustable between a first position in which its front end is movable and its rear end is pivotably locked to a rear joint, and a second position in which its front end is pivotably connected to a front joint and its rear end is movable. In the first position, the locking link acts on the lifting link to raise the front lid edge. In the second position, the locking link acts on the lifting link to raise the rear lid edge.

8 Claims, 3 Drawing Sheets

U.S. PATENT DOCUMENTS

| | | | |
|---|---|---|---|
| 7,201,428 B2 * | 4/2007 | Wagner | 296/107.08 |
| 7,204,542 B2 * | 4/2007 | Queveau et al. | 296/107.08 |
| 7,377,573 B2 * | 5/2008 | Queveau et al. | 296/107.08 |
| 7,686,376 B2 * | 3/2010 | Selle | 296/107.08 |
| 7,780,215 B2 * | 8/2010 | Roesler | 296/107.08 |
| 2002/0093218 A1 | 7/2002 | Weissmueller et al. | |
| 2002/0140250 A1 | 10/2002 | Hasselgruber et al. | |
| 2004/0046410 A1 | 3/2004 | Wagner | |
| 2005/0067853 A1 | 3/2005 | Krajenke | |
| 2006/0163907 A1 | 7/2006 | Queveau et al. | |
| 2006/0186694 A1 | 8/2006 | Wagner | |

FOREIGN PATENT DOCUMENTS

| | | |
|---|---|---|
| DE | 199 32 501 C2 | 3/2001 |
| DE | 103 40 017 B3 | 8/2004 |
| EP | 1 199 202 A2 | 4/2002 |
| FR | 2 840 582 A1 | 12/2003 |
| WO | 03080377 A1 | 10/2003 |

* cited by examiner

TRUNK LID LINK ASSEMBLY FOR CONVERTIBLE VEHICLE

CROSS-REFERENCE TO RELATED APPLICATIONS

This application is a continuation-in-part of U.S. application Ser. No. 11/668,552, filed Jan. 30, 2007; which claims foreign priority benefits under 35 U.S.C. §119(a)-(d) to DE 10 2006 005 001.0, filed Feb. 1, 2006; which are hereby incorporated by reference in their entirety.

BACKGROUND OF THE INVENTION

1. Field of the Invention

The present invention relates to a trunk lid link assembly for closing and opening a trunk lid of a convertible vehicle.

2. Background Art

DE 199 46 454 A1 (corresponding to U.S. Pat. No. 6,193,300) describes a multi-joint link assembly movably connecting a trunk lid to the trunk of a vehicle. The trunk lid may be lowered to cover the trunk and may be raised in either of two opened positions to open the trunk. An operator manually raises the rear edge of the trunk lid to put the trunk lid in one of the opened positions. The operator may then load or unload the trunk. A motor acts on the link assembly causing the front edge of the trunk lid to raise to put the trunk lid in the other opened position. A foldable roof of the vehicle may then move into and out of the trunk. The trunk lid pivots about a pivot axis located at the rear side of the vehicle body to enable the front edge of the trunk lid to raise. Trunk lid raising into both opened positions is not performed completely automatically as the motor assists only with raising the front edge of the trunk lid. A passive spring may assist with the swivel motion associated with manually raising the rear edge of the trunk lid.

DE 103 40 017 B3 (corresponding to U.S. Patent Application Publication No. 2006/0186694) describes a multi-joint link assembly movably connecting a trunk lid to the trunk of a convertible vehicle. The trunk lid may be lowered to cover the trunk and may be raised in either of two opened positions to open the trunk. The rear edge of the trunk lid is raised in one of the opened positions. The front edge of the trunk lid is raised in the other opened position.

Both trunk lid edge raising motions are performed by the link assembly in response to it being actuated by a drive element. This is achieved because the link assembly includes a locking link which can be adjusted between locked and unlocked positions. In the locked position, the locking link is held in place on the vehicle body but can swivel with respect to the vehicle body via a rotary joint fixed to the vehicle body. The locking link is moved to its locked position when the rear edge of the trunk lid is to be raised for an operator to load and unload the trunk. At the same time, a rear lock of the trunk lid is released so that the rear edge of the trunk lid can be raised. In the unlocked position, the locking link unlocks the rotary joint such that the linkage of the locking link via this articulated joint to the vehicle body is released. The locking link is moved to its unlocked position when the front edge of the trunk lid is to be raised for the roof to move into and out of the trunk. In the unlocked position of the locking link, the trunk lid can swivel up about a rear rotary joint fixed to the vehicle body, thereby raising the front edge of the trunk lid.

The rear rotary joint is situated between the trunk lid and the vehicle body. For this reason, the trunk lid and the vehicle body, in particular the rear bumper, have to be designed to enable the trunk lid to swivel about the rear rotary joint. In particular, the bumper requires a convex surface so that the trunk lid does not collide with the bumper or other vehicle components during its swivel motion. An independent link assembly may be used to lift the rear rotary joint from the vehicle body before the swivel process. However, in this case, an additional drive element is required. Another disadvantage is the trunk lid is a component of the link assembly and thereby has to be capable of bearing a load.

SUMMARY OF THE INVENTION

An object of the present invention is a trunk lid link assembly for automatically opening a trunk lid to a first opened position by raising the front edge of the trunk lid and to a second opened position by raising the rear edge of the trunk lid.

In carrying out the above object and other objects, an embodiment of the present invention provides a link assembly for opening and closing a trunk lid of a trunk of a vehicle. The link assembly includes a lifting link and a drive link. The lifting link has front and rear ends and a middle portion with the front end of the lifting link being connected to the trunk lid. The drive link has front and rear ends and a middle portion with the front end of the drive link being articulately supported to the vehicle body, the rear end of the drive link being pivotably connected to the rear end of the lifting link, and the middle portion of the drive link being connected to an actuator to convey forces from the actuator to the lifting link. The lifting link is movable upon being driven by the actuator to move the trunk lid between a closed position in which the trunk lid covers the trunk, a first opened position in which a front edge of the trunk lid is raised, and a second opened position in which a rear edge of the trunk lid is raised;

The link assembly further includes a locking link. The locking link has front and rear ends and a middle portion with the middle portion of the locking link being connected to the middle portion of the lifting link. The front end of the locking link is adjustable between a first locked position in which the front locking link end is pivotably locked to the vehicle body via a front rotary joint fixed to the vehicle body and a first unlocked position in which the front locking link end is released from the vehicle body. The rear end of the locking link is adjustable between a second locked position in which the rear locking link end is pivotably locked to the vehicle body via a rear rotary joint fixed to the vehicle body and a second unlocked position in which the rear locking link end is released from the vehicle body.

When the front locking link end is in the first locked position in which the front locking link end is pivotably locked to the vehicle body and when the rear locking link end is in the second unlocked position in which the rear locking link end is released from the vehicle body, the locking link acts on the lifting link upon the lifting link being driven by the actuator such that the lifting link raises the rear edge of the trunk lid to move the trunk lid to the second opened position.

When the front locking link end is in the first unlocked position in which the front locking link end is released from the vehicle body and when the rear locking link end is in the second locked position in which the rear locking link end is pivotably locked to the vehicle body, the locking link acts on the lifting link upon the lifting link being driven by the actuator such that the lifting link raises the front edge of the trunk lid to move the trunk lid to the first opened position.

Further, in carrying out the above object and other objects, an embodiment of the present invention provides a convertible vehicle having a trunk with a trunk lid. The trunk lid has front and rear edges. The front trunk lid edge faces the vehicle interior and the rear trunk lid edge faces the rear of the vehicle. The trunk lid is movable between a closed position in which the trunk lid covers the trunk, a first opened position in which the front trunk lid edge is raised to enable the roof to move into and out of the trunk, and a second opened position in which the rear trunk lid edge is raised to enable an operator to load and unload the trunk. The vehicle further includes a roof movable between a closed position in which the roof covers the vehicle interior and a stored position in which the roof is stored in the trunk. A front rotary joint is fixed to the vehicle body near the vehicle interior, and a rear rotary joint fixed to the vehicle body near the rear of the vehicle.

The vehicle further includes an actuator and a link assembly. The link assembly has a lifting link, a drive link, and a locking link for opening and closing the trunk lid between its closed and opened positions. The lifting link has front and rear ends and a middle portion with the front end of the lifting link being connected to the trunk lid. The drive link has front and rear ends and a middle portion with the front end of the drive link being articulately connected to the vehicle body, the rear end of the drive link being pivotably connected to the rear end of the lifting link, and the middle portion of the drive link being connected to the actuator to convey forces from the actuator to the lifting link such that the lifting link is movable to move the trunk lid between its closed and opened positions upon being driven by the actuator. The locking link has front and rear ends and a middle portion with the middle portion of the locking link being connected to the middle portion of the lifting link.

The locking link is adjustable between a first position in which the front locking link end is released from the front rotary joint and the rear locking link end is pivotably locked to the rear rotary joint, and a second position in which the front locking link end is pivotably connected to the front rotary joint and the rear locking link end is released from the rear rotary joint. In the first position, the locking link acts on the lifting link upon the lifting link being driven by the actuator such that the lifting link raises the front edge of the trunk lid to move the trunk lid to the first opened position. In the second position, the locking link acts on the lifting link upon the lifting link being driven by the actuator such that the lifting link raises the rear edge of the trunk lid to move the trunk lid to the second opened position.

Advantages of a trunk lid link assembly in accordance with an embodiment of the present is that additional drives or kinematic systems are not required in order to lift the trunk lid from the vehicle body during the raising motion of the front edge of the trunk lid, and that the vehicle may be designed independently of the design of the link assembly.

In embodiments of the present invention, the rear rotary joint is associated with the locking link and not with the trunk lid. The rear rotary joint may be mounted at any given position on the vehicle body depending upon the configuration of the locking link. As such, the rear rotary joint is not limited to placement between the trunk lid and the vehicle body. In this manner, the shapes of the trunk lid, the vehicle body, and the rear vehicle bumper may be designed independently of the radius of motion of the trunk lid which occurs when the front edge of the trunk lid swivels about the rear rotary joint.

In an embodiment of the present invention, the rear end of the locking link in addition to the front end of the locking link may be locked to the vehicle body and unlocked from the vehicle body. The locking link may thus swivel between first locked and unlocked positions and between second locked and unlocked positions.

For placing the trunk lid in its first opened position in which the front edge of the trunk lid is raised to enable the roof to move into and out of the trunk, the front end of the locking link is converted to the first unlocked position and the rear end of the locking link is converted to the second locked position. In the first unlocked position of the locking link, the front locking unit unlocks the front end of the locking link from the front rotary joint. In the second locked position of the locking link, the rear locking unit locks the rear end of the locking link to the rear rotary joint. As such, the front end of the locking link can swivel with respect to the vehicle body about the rear rotary joint such that the front edge of the trunk lid can be raised. The conversion of the front and rear ends of the locking link to their respective unlocked and locked positions occurs at the same time.

For placing the trunk lid in its second opened position in which the rear edge of the trunk lid is raised to enable an operator to load and unload the trunk, the front end of the locking link is converted to the first locked position and the rear end of the locking link is converted to the second unlocked position. In the first locked position of the locking link, the front locking unit locks the front end of the locking link to the front rotary joint fixed to the vehicle body. In the second unlocked position of the locking link, the rear locking unit unlocks the rear end of the locking link from the rear rotary joint fixed to the vehicle body. As such, the rear end of the locking link can swivel with respect to the vehicle body about the front rotary joint such that the rear edge of the trunk lid can be raised. The conversion of the front and rear ends of the locking link to the respective locked and unlocked positions occurs at the same time.

As a result of the trunk lid not being directly joined to the vehicle body via the rear rotary joint, when the locking link swivels about the rear rotary joint the trunk lid is raised a short distance away from the vehicle body and from the bumper by the link assembly, thereby avoiding a collision of the trunk lid with other vehicle components in this swivel motion.

Both opening motions of the trunk lid may be performed using the same link assembly which is actuated by a single drive element. No additional kinematic system or additional drive is necessary to raise the trunk lid during the swivel motion about the rear rotary joint.

The front and rear locking units respectively associated with the front and rear rotary joints may be automatic locking units. As such, if the front edge of the trunk lid is to be raised, the front rotary joint can be automatically unlocked by the front locking unit in conjunction with a servomotor; and if the front edge of the trunk lid is to be closed, the front rotary joint can be automatically locked by the front locking unit in conjunction with the servomotor. Likewise, if the rear edge of the trunk lid is to be raised, the rear rotary joint can be automatically unlocked by the rear locking unit in conjunction with a servomotor; and if the rear edge of the trunk lid is to be closed, the rear rotary joint can be automatically unlocked by the rear locking unit in conjunction with the servomotor.

In an embodiment of the present invention, one or more of the locking units are rotary latches. Each rotary latch is able to swivel between two rotational end points by use of an electric motor. A rotary latch in the first rotational end point releases the locking link and in the second rotational end point is rotatably connected to the vehicle body.

When the trunk lid is closed, both locking units are locked; i.e., the locking link is fixedly connected at both ends to the vehicle body. The link assembly has no degrees of freedom when the locking link is locked on both ends. To avoid a hazardous release of the entire link assembly from the vehicle body, a control unit prevents both locking units from being unlocked at the same time during operation. For repair activities, both locking units may be released to allow the locking link or the entire link assembly to be removed.

In an embodiment of the present invention, a first locking mechanism is provided by which the link assembly may be additionally locked to the vehicle body to prevent the trunk lid from lifting during vehicle travel and to avoid objectionable noises. A second locking mechanism is provided by which the trunk lid in its closed state is connected to the vehicle body. As such, to raise the rear edge of the trunk lid the second locking mechanism is unlocked, for example, by a lock that is unlocked using the vehicle key.

The link assembly is advantageously driven via a drive link. For this purpose, at one end the drive link is articulately supported on the vehicle body. The drive link is also articulately connected to the drive element. The drive element may include a hydraulic actuator. The actuating direction for raising the trunk lid may be the same for both opening motions, which in particular lends itself to the use of a linear, translationally adjustable drive element. Depending on whether the front or the rear rotary joint is locked or unlocked, the front edge or the rear edge of the trunk lid is raised. The trunk lid motion is thus controlled via control of the corresponding locking unit.

In an embodiment of the present invention, the link assembly is a seven-bar kinematic linkage having four guide links. One of the guide links forms the locking link which is rotatably lockable to the vehicle body at two interspaced locations. Two of the guide links include front and rear lifting links. Both lifting links are articulately supported at their upper ends to the trunk lid via a longitudinal brace or a bracket of the trunk lid. The front lifting link is articulately connected at its other end to the drive link, whereas the rear lifting link is linked to the locking link. In a middle region, the front lifting link is connected to the locking link via a middle rotary joint. In this manner, a redundant degree of freedom is fixed. When the first end of the locking link is articulately connected to the vehicle body and the second end is unlocked, or when the second end of the locking link is articulately connected to the vehicle body and the first end, i.e., the front rotary joint, is unlocked, the respective link assembly in each case has exactly one degree of freedom, in each case resulting in a precisely defined opening motion of the trunk lid assembly.

The trunk lid may have a one-piece frameless design as the opening motion of the trunk lid is controlled by the locking and unlocking of the locking link. The trunk lid may be designed to be lightweight as well as unstable with respect to buckling forces, as the trunk lid does not constitute an independent guide link and is not a component of the link assembly and therefore does not have to absorb corresponding forces.

The above features, and other features and advantages of the present invention as readily apparent from the following detailed descriptions thereof when taken in connection with the accompanying drawings.

BRIEF DESCRIPTION OF THE DRAWINGS

A trunk lid link assembly in accordance with an embodiment of the present invention is shown in the drawings in which.

DETAILED DESCRIPTION OF THE PREFERRED EMBODIMENT(S)

Figure 1:
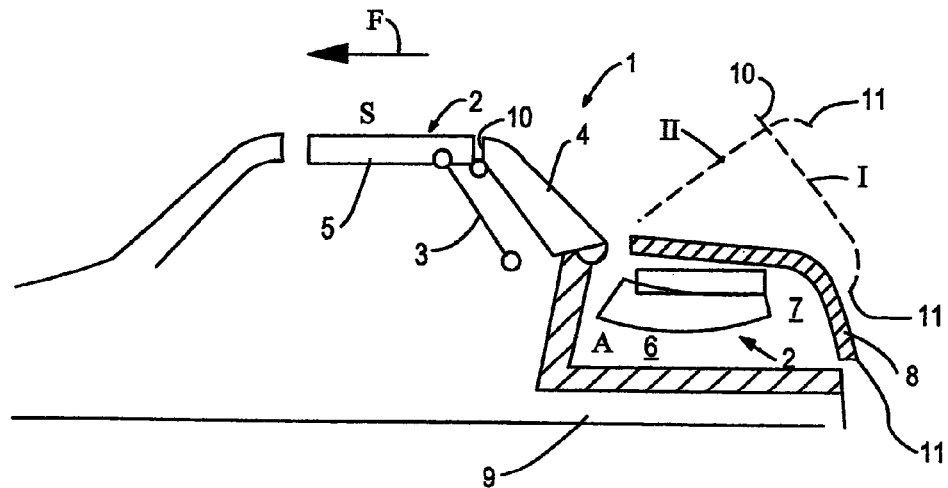
FIG. 1 illustrates a convertible vehicle having a foldable roof and a trunk with a trunk lid in accordance with an embodiment of the present invention.

In the figures, identical components and components with identical functions are denoted by the same reference numerals.

Referring now to FIG. 1, a convertible vehicle 1 having a foldable roof 2 and a trunk 7 with a trunk lid 8 in accordance with an embodiment of the present invention is shown. Roof 2 includes a front roof part 5 and a rear roof part 4. Roof parts 4, 5 are articulately connected to one another to be movable between a closed position S of roof 2 and a stored position A of roof 2. A roof kinematic system 3 is connected to front roof part 5 to move roof parts 4, 5 between the closed and stored roof positions. In the closed roof position S, roof parts 4, 5 are situated one behind one another in the direction of forward vehicle travel F and cover the vehicle interior. In the stored roof position A, roof parts 4, 5 are stacked on top of one another and stored in a rear storage compartment 6 of vehicle 1. Storage compartment 6 may be part of trunk 7 or may directly adjoin trunk 7. Roof 2 is illustrated as a hardtop roof in which roof parts 4, 5 are rigid. However, roof 2 may be a lowerable soft-top roof having a fabric cover stretched on a roof linkage assembly.

Trunk lid 8 includes a front edge 10 and a rear edge 11. Front and rear edges 10, 11 extend in the transverse direction of vehicle 1. Front edge 10 is nearest the vehicle interior. Trunk lid 8 is movable between a closed position, a first opened position I, and a second opened position II. In the closed position of trunk lid 8, trunk lid 8 closes off storage compartment 6 and trunk 7.

In the first opened position I of trunk lid 8, front edge 10 of trunk lid 8 is swivelled up so that roof 2 can be moved into and out of storage compartment 6 (or trunk 7). That is, front edge 10 of trunk lid 8 is swivelled up so that roof 2 can be moved between its closed position S and its stored position A. In the first opened position I of trunk lid 8, rear edge 11 of trunk lid 8 is raised a short distance away from vehicle body 9.

In the second opened position II of trunk lid 8, rear edge 11 of trunk lid 8 is swivelled up to uncover trunk 7. That is, rear edge 11 of trunk lid 8 is swivelled up so that an operator can load or unload trunk 7. In the second opened position II of trunk lid 8, front edge 10 of trunk lid 8 is raised a short distance away from vehicle body 9 by trunk lid link assembly 12 (not shown in FIG. 1) to prevent trunk lid 8 from colliding with other vehicle parts during the swivel motion.

With reference to FIGS. 2, 3, 4, 5, and 6, a trunk lid link assembly 12 movably connects trunk lid 8 to vehicle body 9. Link assembly 12 connects to an upper longitudinal brace 13 to connect to trunk lid 8. Longitudinal brace 13 is a part of trunk lid 8 or is fixedly connected thereto. Link assembly 12 is designed as a seven-joint link assembly.

Figure 2:
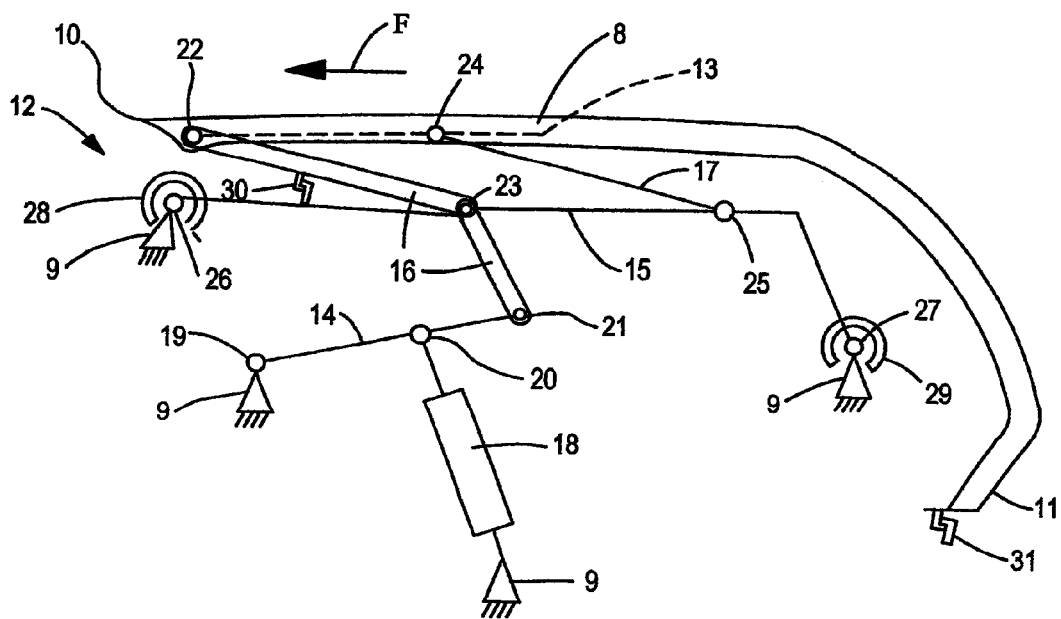
FIG. 2 illustrates the trunk lid in a closed position covering the trunk with a locking link of the trunk lid link assembly being locked at its ends to the vehicle body at two inter-spaced locations.

With reference to FIG. 2, which illustrates trunk lid 8 in its closed position covering storage compartment 6 and trunk 7, link assembly 12 includes four guide links: a drive link 14, a locking link 15, a front angular lifting link 16, and a rear lifting link 17. A drive element 18 is used to adjust link assembly 12. Drive element 18 is articulately supported at one end on vehicle body 9. Drive element 18 may be a hydraulic actuator. Drive element 18 is articulately connected at its other end to a middle portion of drive link 14 via a rotary joint 20. Drive link 14 is pivotably connected at its front end to vehicle body 9 via a rotary joint 19 mounted to vehicle body 9. When drive element 18 is actuated, drive link 14 is acted upon by a torque about the rotational axis of rotary joint 19.

On its rear end facing away from rotary joint 19, drive link 14 is pivotably connected via a third rotary joint 21 to the lower end of the lower leg of front lifting link 16. The upper end of the upper leg of front lifting link 16 is articulately connected to longitudinal brace 13 of trunk lid 8 via a rotary joint 22. Alternatively, the upper end of the upper leg of front lifting link 16 is articulately connected to a bracket of trunk lid 8 via rotary joint 22. A rotary joint 23 is located between rotary joints 21, 22 in the middle bending point of front lifting link 16. The middle bending point of front lifting link 16 is between the upper and lower legs of front lifting link 16. With the assistance of rotary joint 23, the middle bending point of front lifting link 16 is articulately connected to a middle portion of locking link 15 in order to fix redundant degrees of freedom.

Rear lifting link 17 is situated in parallel to the upper leg of front lifting link 16. The upper end of rear lifting link 17 is articulately connected to longitudinal brace 13 of trunk lid 8 via a rotary joint 24. The lower end of rear lifting link 17 is articulately connected to locking link 15, which is parallel to longitudinal brace 13 of trunk lid 8, via a rotary joint 25. Locking link 15 has a bent design in its rear area. The front end of locking link 15 is articulately connected to vehicle body 9 via a front rotary joint 26. The rear end of locking link 15 is pivotably connected to vehicle body 9 via a rear rotary joint 27. Rear rotary joint 27 which is situated in the direction of travel and at a distance from trunk lid 8. Rotary joints 19, 21, 22, 24, 25, 26, and 27 form a total of seven rotary joints of link assembly 12.

At its front end, locking link 15 is articulately connected to vehicle body 9 via front rotary joint 26. A front locking unit 28 automatically locks and unlocks this articulated connection. Front locking unit 28 may be a rotary latch. Front locking unit 28 swivels to a rotational end position to articulately fix the front end of locking link 15 to vehicle body 9. At its rear end, locking link 15 is articulately connected to vehicle body via rear rotary joint 27. A rear locking unit 29 automatically locks and unlocks this articulated connection. Rear locking unit 29 may also be a rotary latch. Rear locking unit 29 likewise swivels into a rotational end position in which the rear end of locking link 15 cannot release from its articulated connection to vehicle body 9.

In FIG. 2, front and rear locking units 28, 29 respectively lock the front and rear ends of locking link 15 to vehicle body 9 at the two inter-spaced locations. In this state, link assembly 12 has no degrees of freedom. A first locking mechanism 30 fixes front lifting link 16 to vehicle body 9 to prevent tolerance-related motions of link assembly 12. A second locking mechanism 31 fixes rear end 11 of trunk lid 8 to vehicle body 9.

The rear end of locking link 15 may swivel about front rotary joint 26 when the front end of locking link 15 is locked to front rotary joint 26 and the rear end of locking unit 15 is unlocked from rear rotary joint 27. This swivel motion raises rear edge 11 of trunk lid 8. Likewise, the front end of locking link 15 may swivel about rear rotary joint 27 when the front end of locking link 15 is unlocked from front rotary joint 26 and the rear end of locking link 15 is locked to rear rotary joint 27. This swivel motion raises front edge 10 of trunk lid 8. Both swivel motions are brought about by drive element 18 acting on link assembly 12. The determination as to which swivel motion is to be performed may be implemented by respectively actuating the proper ones of front and rear locking units 28, 29.

Figure 3:
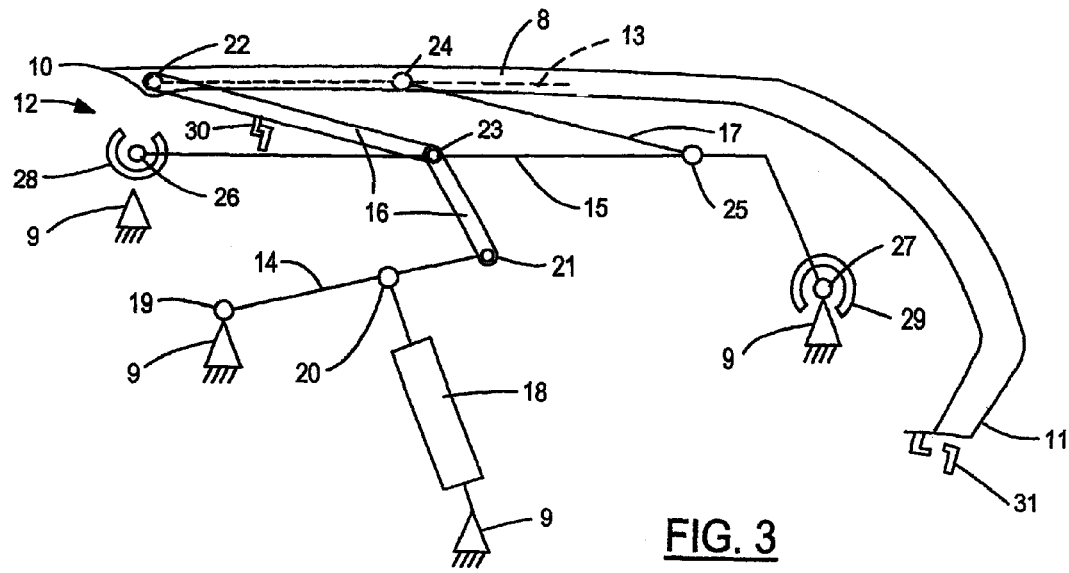
FIG. 3 illustrates the trunk lid in the closed position with the front end of the locking link being unlocked from the vehicle body and the rear end of the locking link being locked to the vehicle body to enable the trunk lid link assembly to raise the front edge of the trunk lid.

In FIG. 3, trunk lid 8 is in its closed position with the front end of locking link 15 being unlocked from vehicle body 9 and the rear end of locking link 15 being locked to vehicle body 9 to enable link assembly 12 to raise front edge 10 of trunk lid 8. Front locking unit 28 unlocks front rotary joint 26 in order for locking link 15 to swivel about rear rotary joint 27. For this purpose, as shown in FIG. 3, front locking unit 28 swivels into the rotational end position in which locking link 15 is released. An actuator associated with front locking unit 28 automatically adjusts front locking unit 28. In addition, as shown in FIG. 3, each of locking mechanisms 30, 31 unlock via an actuator to allow link assembly 12 and trunk lid 8 to swivel. Drive link 14 swivels in the counterclockwise direction about rotary joint 19 by action upon drive link 15 via a torque produced by drive element 18. At the same time, the lower leg of front lifting link 16 swivels in the clockwise direction about rotary joint 23. As a result of the articulated connection with front lifting link 16, locking link 15 simultaneously raises via rotary joint 23 and swivels in the clockwise direction about rear rotary joint 27. Rear locking unit 29 locks this articulated connection. At the same time, the upper leg of front lifting link 16 swivels in the clockwise direction about rotary joint 23, causing front edge 10 of trunk lid 8 to raise. However, because of the lifting of longitudinal brace 13, rear edge 11 of trunk lid 8 also swivels a short distance away from vehicle body 9, upward and to the right as viewed in the plane of FIG. 3, so that rear edge 11 of trunk lid 8 does not collide with a vehicle component during the swivel motion.

Figure 4:
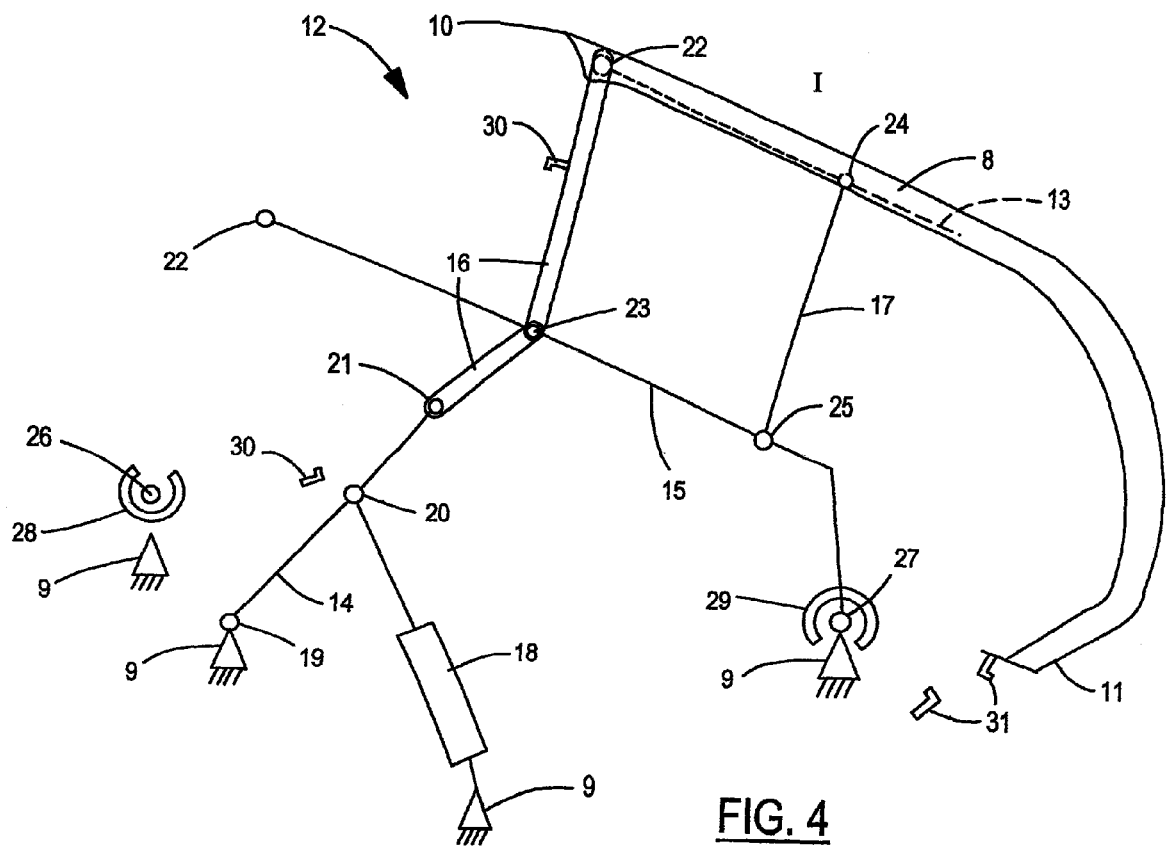
FIG. 4 illustrates the trunk lid in a first opened position in which the front edge of the trunk lid is raised to expose the trunk to enable the foldable roof to move into and out of the trunk.

FIG. 4 illustrates trunk lid 8 in the first opened position I in which front edge 10 of trunk lid 8 is raised to expose trunk 7 to enable roof 2 to move into and out of storage compartment 6. As such, FIG. 4 illustrates the result of the front trunk lid edge swivel motion described with reference to FIG. 3. FIG. 4 illustrates the first unlocked position of locking link 15 in which front edge 10 of trunk lid 8 raises and rear edge 11 of trunk lid 8 moves away from vehicle body 9, upward and to the rear. Roof parts 4, 5 can move into and out of storage compartment 6. Drive element 18 is fully extended and supports drive link 14 at rotary joint 20. No forces resulting from the swivel motion act on trunk lid 8 as trunk lid 8 is not a component of link assembly 12. As such, link assembly 12 without trunk lid 8 can swivel into the first opened position I.

Figure 5:
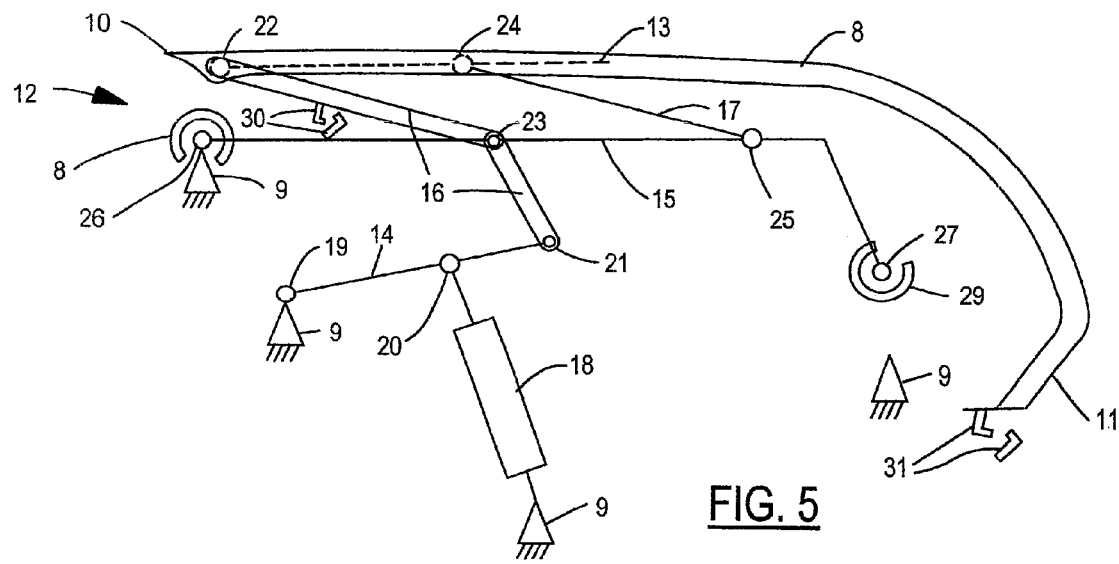
FIG. 5 illustrates the trunk lid in the closed position with the front end of the locking link being locked to the vehicle body and the rear end of the locking link being unlocked from the vehicle body to enable the trunk lid link assembly to raise the rear edge of the trunk lid.

In FIG. 5, trunk lid 8 is in its closed position with the front end of locking link 15 locked to vehicle body 9 and the rear end of locking link 15 unlocked from vehicle body 9 to enable link assembly 12 to raise rear edge 11 of trunk lid 8. FIG. 5 further illustrates preparations made for swiveling locking link 15 about front rotary joint 26. Locking mechanisms 30, 31 are unlocked. Rear locking unit 29 is swivelled into a rotational end position by an actuator to release the rear end of locking link 15 from the articulated connection with vehicle body 9. To raise rear edge 11 of trunk lid 8, drive element 18 is actuated which causes drive link 14 to swivel in the counterclockwise direction about rotary joint 19, which is fixed to vehicle body 9. The lower leg of front lifting link 16 rotates in the clockwise direction about rotary joint 23 and simultaneously raises the rear end of locking link 15, which swivels in the counterclockwise direction about front rotary joint 26. Rear edge 11 of trunk lid 8 lifts away from vehicle body 9. As a result of the simultaneous swiveling of the upper leg of front lifting link 16 and the swivelling of rear lifting link 17 in the clockwise direction about rotary joints 23 and 25, respectively, front edge 10 of trunk lid 8 lifts a short distance away from vehicle body 9, upward and to the right as viewed in the plane of FIG. 5 to prevent collision with vehicle components while trunk lid 8 is swiveling.

Figure 6:
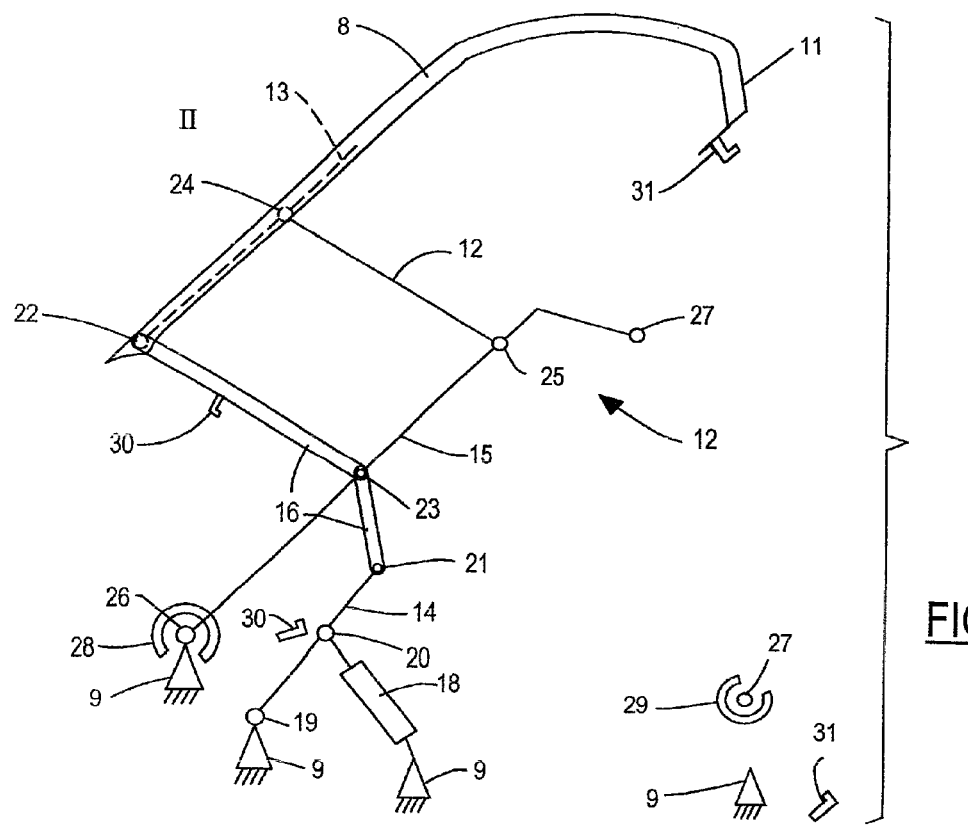
FIG. 6 illustrates the trunk lid in a second opened position in which the rear edge of the trunk lid is raised to expose the trunk to enable an operator to load and unload the trunk.

FIG. 6 illustrates trunk lid 8 in the second opened position II in which rear edge 11 of trunk lid 8 is raised to expose trunk 7 to enable an operator to load and unload trunk 7. The swivel motion of link assembly 12 described with respect to FIG. 5 results in the second opened position II shown in FIG. 6. FIG. 6 illustrates the second unlocked position of locking link 15 in which rear edge 11 of trunk lid 8 raises.

On account of the association of rear rotary joint 27 with locking link 15 it is possible to attach rear rotary joint 27 together with rear locking unit 29 to vehicle body 9, regardless of the position of trunk lid 8. Furthermore, during any swivel motion, both front and rear edges 10, 11 of trunk lid 8 are lifted from vehicle body 9 without having to provide an additional kinematic system or additional drive.

| List of Reference Numerals | |
|---|---|
| 1 | Convertible vehicle |
| 2 | Vehicle roof |
| 3 | Roof kinematic system |
| 4 | Roof part |
| 5 | Roof part |
| 6 | Storage compartment |
| 7 | Trunk |
| 8 | Trunk lid |
| 9 | Vehicle body |
| 10 | Front edge of trunk lid |
| 11 | Rear edge of trunk lid |
| 12 | Trunk Lid Link Assembly |
| 13 | Longitudinal brace |
| 14 | Drive link |
| 15 | Locking link |
| 16 | Front lifting link |
| 17 | Rear lifting link |
| 18 | Drive element |
| 19 | Rotary joint |
| 20 | Rotary joint |
| 21 | Rotary joint |
| 22 | Rotary joint |
| 23 | Rotary joint |
| 24 | Rotary joint |
| 25 | Rotary joint |
| 26 | Front rotary joint |
| 27 | Rear rotary joint |
| 28 | Front locking unit |
| 29 | Rear locking unit |
| 30 | First locking mechanism |
| 31 | Second locking mechanism |
| F | Direction of travel |
| S | Closed roof position |
| A | Stored roof position |
| I | First roof opened position (second locked position) |
| II | Second roof opened position (first locked position) |

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A link assembly for opening and closing a trunk lid of a trunk of a vehicle, the link assembly comprising:
   a lifting link having front and rear ends and a middle portion, wherein the front end of the lifting link is connected to the trunk lid;
   a drive link having front and rear ends and a middle portion, the front end of the drive link is articulately supported to the vehicle body, the rear end of the drive link is pivotably connected to the rear end of the lifting link, and the middle portion of the drive link is connected to an actuator to convey forces from the actuator to the lifting link;
   wherein the lifting link is movable upon being driven by the actuator to move the trunk lid between a closed position in which the trunk lid covers the trunk, a first opened position in which a front edge of the trunk lid is raised, and a second opened position in which a rear edge of the trunk lid is raised; and
   a locking link having front and rear ends and a middle portion, the middle portion of the locking link connected to the middle portion of the lifting link;
   the front end of the locking link is adjustable between a first locked position in which the front locking link end is pivotably locked to the vehicle body via a front rotary joint fixed to the vehicle body and a first unlocked position in which the front locking link end is released from the vehicle body;
   the rear end of the locking link is adjustable between a second locked position in which the rear locking link end is pivotably locked to the vehicle body via a rear rotary joint fixed to the vehicle body and a second unlocked position in which the rear locking link end is released from the vehicle body;
   wherein, when the front locking link end is in the first locked position in which the front locking link end is pivotably locked to the vehicle body and when the rear locking link end is in the second unlocked position in which the rear locking link end is released from the vehicle body, the locking link acts on the lifting link upon the lifting link being driven by the actuator such that the lifting link raises the rear edge of the trunk lid to move the trunk lid to the second opened position;
   wherein, when the front locking link end is in the first unlocked position in which the front locking link end is released from the vehicle body and when the rear locking link end is in the second locked position in which the rear locking link end is pivotably locked to the vehicle body, the locking link acts on the lifting link upon the lifting link being driven by the actuator such that the lifting link raises the front edge of the trunk lid to move the trunk lid to the first opened position.

2. The link assembly of claim 1 further comprising:
   a front locking unit for automatically locking the front locking link end to the front rotary joint and for automatically unlocking the front locking link end from the front rotary joint; and
   a rear locking unit for automatically locking the rear locking link end to the rear rotary joint and for automatically unlocking the rear locking link end from the rear rotary joint.

3. The link assembly of claim 2 wherein:
at least one of the locking units includes a rotary latch.

4. The link assembly of claim 2 wherein:
both locking units may be unlocked at the same time.

5. The link assembly of claim 1 further comprising:
a locking mechanism for locking the lifting link to the vehicle body when the trunk lid is in the closed position.

6. The link assembly of claim 1 further comprising:
a locking mechanism for locking the trunk lid to the vehicle body when the trunk lid is in the closed position.

7. The link assembly of claim 1 further comprising:
a second lifting link pivotably connected at one end to the trunk lid;
wherein the middle portion of the locking link is pivotably connected to the other end of the second lifting link.

8. The link assembly of claim 1 wherein:
the actuating direction of the actuator is the same for raising the front and rear edges of the trunk lid.

\* \* \* \* \*

UNITED STATES PATENT AND TRADEMARK OFFICE
CERTIFICATE OF CORRECTION

PATENT NO.        : 7,900,992 B2
APPLICATION NO.   : 12/424122
DATED             : March 8, 2011
INVENTOR(S)       : Holger Roeder It is certified that error appears in the above-identified patent and that said Letters Patent is hereby corrected as shown below:

On the Title Page under the Related U.S. Application Data section

Delete:

"(63) Continuation of application No. 11/668,552, filed on Jan. 30, 2007, now abandoned."

and insert:

--(63) Continuation-in-part of application No. 11/668,552, filed on Jan. 30, 2007, now abandoned.--

Signed and Sealed this
Third Day of May, 2011

David J. Kappos
*Director of the United States Patent and Trademark Office*